United States Patent
Wang et al.

(10) Patent No.: US 9,697,728 B2
(45) Date of Patent: Jul. 4, 2017

(54) PROJECTION SYSTEM, PROJECTION APPARATUS, AND METHOD FOR OPERATING PROJECTION APPARATUS

(71) Applicant: Coretronic Corporation, Hsin-Chu (TW)

(72) Inventors: Gwo-Chyuan Wang, Hsin-Chu (TW); Chih-Chen Chen, Hsin-Chu (TW)

(73) Assignee: Coretronic Corporation, Hsin-chu (TW)

(*) Notice: Subject to any disclaimer, the term of this patent is extended or adjusted under 35 U.S.C. 154(b) by 0 days.

(21) Appl. No.: 14/816,085

(22) Filed: Aug. 3, 2015

(65) Prior Publication Data

US 2016/0202949 A1    Jul. 14, 2016

(30) Foreign Application Priority Data

Jan. 14, 2015    (CN) .......................... 2015 1 0017508

(51) Int. Cl.
  *G08C 23/02*    (2006.01)
  *G06F 3/16*    (2006.01)
(52) U.S. Cl.
  CPC ............. *G08C 23/02* (2013.01); *G06F 3/167* (2013.01)

(58) Field of Classification Search
  CPC .................................. G08C 23/02; G06F 3/167
  See application file for complete search history.

(56) References Cited

U.S. PATENT DOCUMENTS

| 2002/0105624 | A1 | 8/2002 | Quori | |
| 2012/0045994 | A1* | 2/2012 | Koh | H04L 63/0492 455/41.3 |
| 2014/0003820 | A1* | 1/2014 | Lee | G08C 19/28 398/106 |
| 2014/0095159 | A1* | 4/2014 | Lee | G10L 15/26 704/235 |

OTHER PUBLICATIONS

Andrew Webster, "Sensory technology lets you unlock a phone with your voice," May 2, 2012, Available at: http://www.theverge.com/2012/5/2/2993553/sensory-voice-control-technology-phone-unlock.

* cited by examiner

*Primary Examiner* — Leon Flores
(74) *Attorney, Agent, or Firm* — Jianq Chyun IP Office

(57) ABSTRACT

A projection system, a projection apparatus, and a method for operating the projection apparatus are provided. According to a characteristic of a sound transmitted between the projection apparatus and an electronic device external to the projection apparatus, the projection apparatus is adapted to be controlled by the electronic device or is adapted to control the electronic device to execute a corresponding operation.

12 Claims, 4 Drawing Sheets

PROJECTION SYSTEM, PROJECTION APPARATUS, AND METHOD FOR OPERATING PROJECTION APPARATUS

CROSS-REFERENCE TO RELATED APPLICATION

This application claims the priority benefit of China application serial no. 201510017508.7, filed on Jan. 14, 2015. The entirety of the above-mentioned patent application is hereby incorporated by reference herein and made a part of this specification.

BACKGROUND OF THE INVENTION

Field of the Invention

The disclosure relates to a display device and an operation method thereof, and more particularly, a projection system, a projection apparatus, and a method for operating the projection apparatus.

Description of Related Art

When connecting to a network, projectors available on the market require a user to manually input a setting for a network connection before the network can be used to connect to other electronic devices. In addition, if the projector itself is locked, which the projector cannot be operated such as projecting images, the user have to enter a password so as to remove the operation lock of the projector itself. Unlocking the projector by inputting the password would result in the burden of memorizing the password and inconvenience because of inputting the password through a keyboard.

Methods of controlling a projector have been disclosed, such as US patent application publication US 20020105624. However, numerous issues still exist.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The disclosure provides a projection system, a projection apparatus, and a method for operating the projection apparatus that enhance convenience and safety.

Other objects and advantages of the invention can be further illustrated by the technical features broadly embodied and described as follows.

In order to achieve one or a portion of or all of the objects or other objects, an embodiment of the disclosure provides a projection system including an electronic device and a projection apparatus external to the projection apparatus. The projection apparatus is adapted to be controlled by the electronic device or is adapted to control the electronic device to execute a corresponding operation according to a characteristic of a sound transmitted between the projection apparatus and the electronic device.

In an embodiment of the projection system of the disclosure, the projection apparatus includes a projection unit and a sound control unit. The sound control unit is coupled to the projection unit and is adapted to control the projection apparatus or the electronic device to execute the corresponding operation according to the characteristic of a sound transmitted between the sound control unit and the electronic device.

In order to achieve one or a portion of or all of the objects or other objects, an embodiment of the disclosure provides a projection apparatus including a projection unit and a sound control unit. The sound control unit is coupled to the projection unit and is adapted to control the projection apparatus or the electronic device external to the projection apparatus to execute a corresponding operation according to a characteristic of a sound transmitted between the sound control unit and the electronic device.

In an embodiment of the disclosure, the sound control unit includes a sound input unit and a control unit. The sound input unit is adapted to receive a first sound signal coming from the electronic device. The control unit is coupled to the sound input unit and the projection unit for determining whether a characteristic of the first sound signal coincides with a default characteristic. The control unit is adapted to control the projection apparatus to execute a default operation corresponding to the default characteristic if the characteristic of the first sound signal coincides with the default characteristic. In one embodiment, the default operation includes unlocking the projection apparatus.

In an embodiment of the disclosure, the projection apparatus further includes a communication unit coupled to the control unit. The default operation includes establishing a network connection with the electronic device via the communication unit. The control unit is adapted to receive and process image data coming from the electronic device via the network connection and to control the projection unit to perform projection according to the image data.

In an embodiment of the disclosure, the sound control unit includes a sound output unit and a control unit. The projection apparatus further includes a communication unit. The control unit is coupled to the sound output unit and the projection unit and is adapted to control the sound output unit to output a second sound signal for the electronic device to determine whether a characteristic of the second sound signal coincides with a default characteristic, and thereby the projection apparatus or the electronic device is capable of determining whether to execute a default operation corresponding to the default characteristic. The default operation includes establishing a network connection with the electronic device via the communication unit when the characteristic of the second sound signal coincides with the default characteristic. The control unit is adapted to receive and process image data coming from the electronic device via the network connection and to control the projection unit to perform projection according to the image data.

In order to achieve one or a portion of or all of the objects or other objects, an embodiment of the disclosure provides an operating method for operating a projection apparatus having a sound control unit including the following steps. Receiving or transmitting a sound between the projection apparatus and an electronic device external to the projection apparatus via the sound control unit. The projection apparatus or the electronic device is controlled to execute a corresponding operation according to a characteristic of the sound.

In one embodiment of the operating method for operating a projection apparatus, the step of controlling the projection apparatus to execute a corresponding operation according to a characteristic of the sound includes the following steps. A first sound signal coming from the electronic device is received via the sound control unit. Whether a characteristic of the first sound signal coincides with a default characteristic is determined via the sound control unit. If the characteristic of the first sound signal coincides with the default characteristic, the projection apparatus is controlled to execute the default operation corresponding to the default characteristic.

In one embodiment of the operating method for operating a projection apparatus, the default operation includes unlocking the projection apparatus.

In one embodiment of the operating method for operating a projection apparatus, the default operation includes establishing a network connection with the electronic device by the projection apparatus.

In one embodiment of the operating method for operating a projection apparatus, the operating method further includes the following steps. The sound control unit receives and processes image data coming from the electronic device via a network connection. Projection is performed according to the image data.

In one embodiment of the operating method for operating a projection apparatus, the step of controlling the projection apparatus or the electronic device to execute a corresponding operation according to a characteristic of the sound includes the following steps. The sound control unit outputs a second sound signal for the electronic device to determine whether a characteristic of the second sound signal coincides with a default characteristic, and the projection apparatus or the electronic device determines to execute the default operation corresponding to the default characteristic if the characteristic of the second sound signal coincides with a default characteristic.

In one embodiment of the operating method for operating a projection apparatus, the operating method further includes the following steps. When the characteristic of the second sound signal coincides with the default characteristic, the default operation includes establishing a network connection between the electronic device and the projection apparatus. The sound control unit receives and processes image data coming from the electronic device via the network connection. Projection is performed according to the image data.

In one embodiment of the operating method for operating a projection apparatus, the characteristic of the sound includes at least one of sound intensity, sound frequency, and voiceprint.

In the embodiments of the disclosure, the projection apparatus or the electronic device is controlled to execute a corresponding operation according to a characteristic of a sound transmitted between the projection apparatus and the electronic device. In the embodiments of the disclosure, a sound signal coming from the electronic device is received via the sound input unit of the sound control unit of the projection apparatus, or, alternatively, a sound signal is outputted to the electronic device via the sound output unit of the sound control unit of the projection apparatus, so as to control the projection apparatus or the electronic device to execute a default operation corresponding to a default characteristic of a sound signal. Accordingly, utilization convenience and safety of the projection system are greatly enhanced.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. It is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Accordingly, the drawings and descriptions will be regarded as illustrative in nature and not as restrictive.

Figure 1:
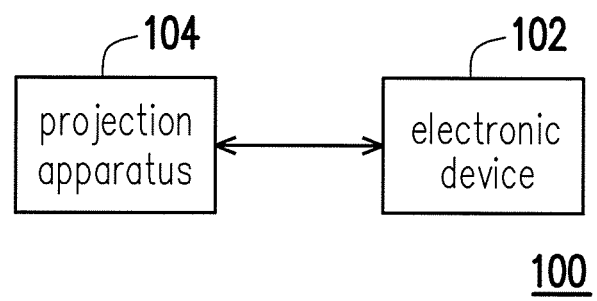
FIG. 1 is a schematic diagram of a projection system of one embodiment of the disclosure.

FIG. 1 is a schematic diagram of a projection system of one embodiment of the disclosure. Referring to FIG. 1, a projection system 100 of the present embodiment includes an electronic device 102 and a projection apparatus 104. The electronic device is external to the projection apparatus. The electronic device, for example, is a portable device, such as a smart phone, a tablet computer, or a notebook computer; however the invention is not limited thereto. The electronic device 102 may be capable of executing a corresponding operation according to a characteristic of a sound transmitted from the projection apparatus 104 and received by the electronic device 102, and the projection apparatus 104 may be capable of executing a corresponding operation according to a characteristic of a sound transmitted from the electronic device 102 and received by the projection apparatus 104. The characteristic of the transmitted sound in the present embodiment includes at least one of sound intensity, sound frequency, and voiceprint, for example. The operation corresponding to the transmitted sound includes unlocking the projection apparatus, enabling the projection apparatus to perform projection, or enabling the electronic device 102 or the projection apparatus 104 to actively establish connection to each other, for example. By unlocking the projection apparatus, the projection apparatus, for example, can receive instructions to perform operation such as adjusting the setting of projection and/or selecting the resource to be projected. By means of transmitting a sound having a specific characteristic, the projection apparatus 104 controls the electronic device 102 and/or the projection apparatus 104 is controlled by the electronic device 102 to execute a corresponding operation. Accordingly, complicated operations by a user, such as manually entering a password or setting up a network connection, are educed, and convenience of operating the projection system is enhanced. In addition, since the transmitted sound has a specific characteristic, safety of operation is greatly enhanced.

Figure 2:
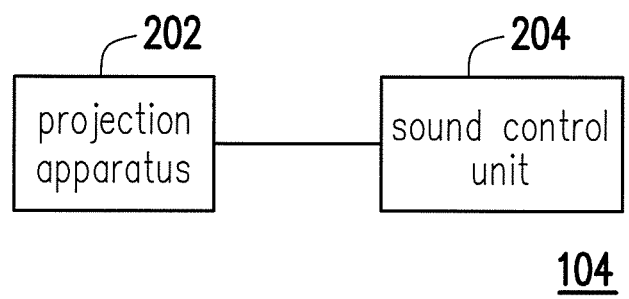
FIG. 2 is a schematic diagram of a projection apparatus of one embodiment of the disclosure.

As illustrated in FIG. 2, the projection apparatus 104 of the present embodiment includes a projection unit 202 and a sound control unit 204, wherein the projection unit 202 is coupled to the sound control unit 204. The projection unit 202 may include, for example, a projection lens, a light valve, and a light source (not shown). In the present embodiment, the projection unit 202 is used for projecting a visual image, and the sound control unit 204 is used for controlling the projection apparatus 104 and/or the electronic device 102 to execute a corresponding operation according to a characteristic of a sound transmitted between the sound control unit 204 and the electronic device 102.

In one embodiment, according to a characteristic of a sound signal coming from the electronic device 102, the sound control unit 204 unlocks the projection apparatus 104, sends out a connection request to the electronic device 102 to establish connection with the electronic device 102, and/or controls the projection apparatus to perform projection. In another embodiment, the sound control unit 204 controls the projection apparatus 104 to send out a sound signal having a specific characteristic. According to the sound signal sent out by the projection apparatus 104, the electronic device 102 sends out a connection request to the projection apparatus 104 to establish connection with the projection apparatus 104. The electronic device 102 and the projection apparatus 104 are connected to each other by means of Wi-Fi technology, Bluetooth technology, etc., or are connected to each other by means of a cable network, but the invention is not limited thereto. When the connection between the electronic device 102 and the projection apparatus 104 is completed, the sound control unit 204 may control the projection unit 202 to perform projection according to image data coming from the electronic device 102. Since the operation of the embodiments executed by the projection apparatus 104 or the electronic device 102 may be controlled by means of transmission/reception of a sound having a specific characteristic and does not require a user to perform the complicated operation (e.g. manually inputting the setting and/or password), convenience and safety of operating the projection system are enhanced. The sound received/transmitted may include a sound signal generated and sent out by the electronic device 102/the projection apparatus 104, or a voice signal sent out by a user himself, for example.

Figure 3:
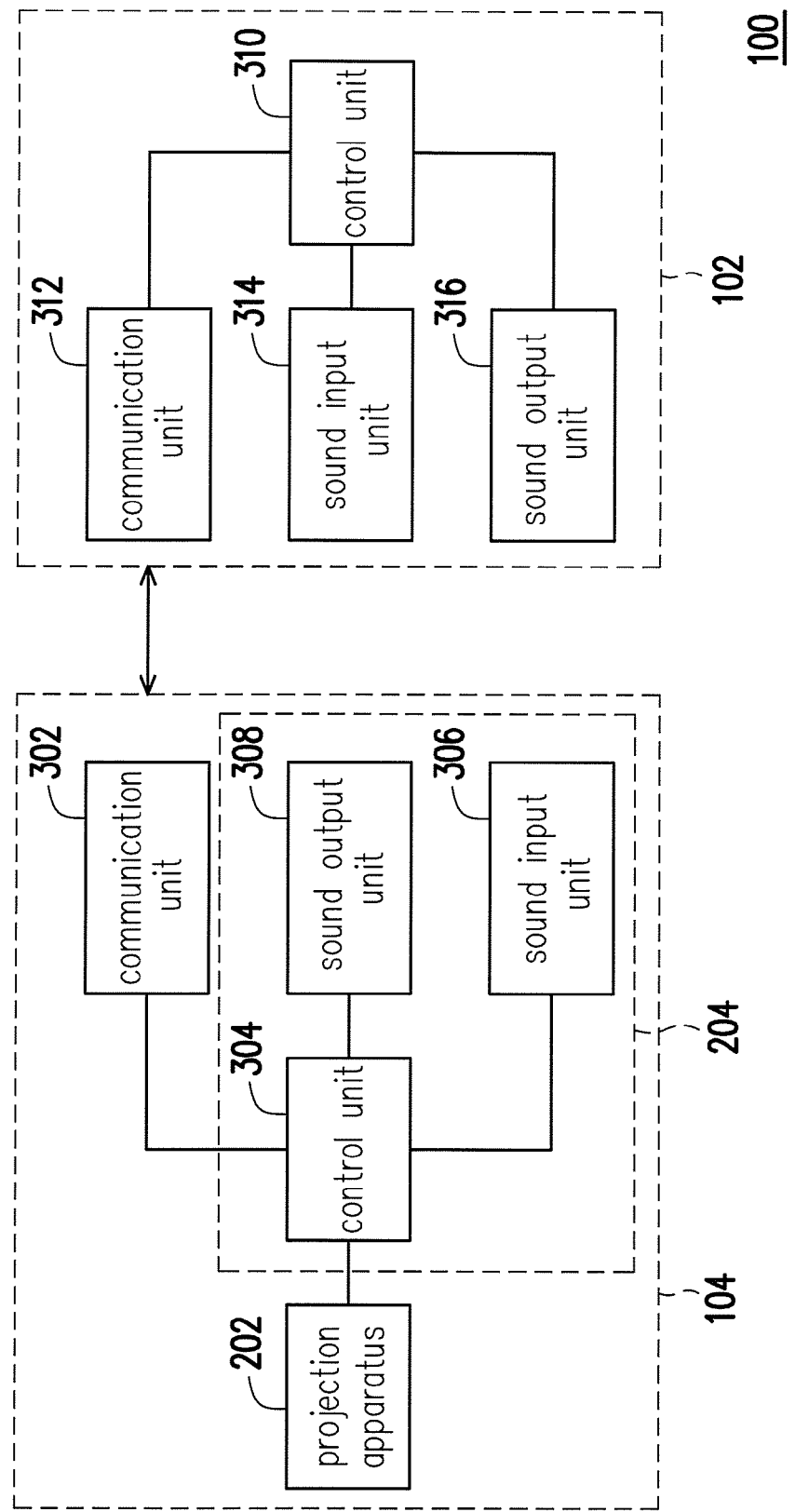
FIG. 3 is a schematic diagram of a projection system of another embodiment of the disclosure.

FIG. 3 is a schematic diagram of a projection system of another embodiment of the disclosure. Referring to FIG. 3, the projection apparatus 104 further includes a communication unit 302, and the sound control unit 204 further includes a control unit 304, a sound input unit 306, and a sound output unit 308. The control unit 304 is coupled to the communication unit 302, the sound input unit 306, and the sound output unit 308. In one embodiment, the sound input unit 306, for example, is a sound sensor. The sound output unit 308, for example, is a speaker. The communication unit 302, for example, is a chip or circuit supporting wireless fidelity (Wi-Fi), blue tooth, or other suitable wireless transmission. The control unit 304, for example, includes a processor, a micro control unit, a processing IC circuit, or a chipset adapted to operate the projection unit 202. The electronic device 102 includes a control unit 310, a communication unit 312, a sound input unit 314, and a sound output unit 316, wherein the control unit 310 is coupled to the communication unit 312, the sound input unit 314, and the sound output unit 316. In one embodiment, the sound input unit 314, for example, is a sound sensor. The sound output unit 316, for example, is a speaker. The communication unit 312, for example, is a chip or circuit supporting wireless fidelity (Wi-Fi), blue tooth, or other suitable wireless transmission. The control unit 310, for example, includes a processor, a micro control unit, a processing IC circuit, or a chipset adapted to operate the electronic device 102.

The sound input unit 306 in the projection apparatus 104 is adapted to receive a sound signal, e.g., a sound signal sent out from the sound output unit 316 of the electronic device 102. In the projection apparatus 104 of the present embodiment, the control unit 304 of the sound control unit 204 determines whether a characteristic of a sound signal received by the sound input unit 306 coincides with a default characteristic. If the characteristic of the sound signal coincides with the default characteristic, the control unit 304 controls the projection apparatus 104 to execute a default operation corresponding to the default characteristic. In one embodiment, the control unit 304 of the sound control unit 204 may comprise a memory (not shown) storing at least one default characteristic of the sound signal. This memory may further stores one or more instructions to perform default operations. These default operations are, for example, the predetermined operations and the instructions to perform default operations may be stored in a form of a lookup table which indicates the relation between the characteristics of the sound signal and corresponding instructions to perform the default operations. In another embodiment, the instructions to perforin default operations may be stored in another memory (not shown) of the control unit 304 of the sound control unit 304. For example, provided that the default operation is unlocking the projection apparatus 104, the control unit 304 determines whether the frequency of a sound signal received by the sound input unit 306 coincides with the default frequency, such as whether the frequency of a sound signal received by the sound input unit 306 is identical to the default frequency. If the frequency of the sound signal coincides with the default frequency, then the projection apparatus 104 is unlocked.

In some embodiments, multiple different default characteristics are specified, and the different default characteristics correspond to different default operations. For example, multiple frequencies are specified as default frequencies, such that the control unit 304 may determine whether a sound signal received by the sound input unit 306 coincides with any one of the default frequencies. When the sound signal coincides with any one of the default frequencies, a default operation corresponding to this default frequency is executed.

In another embodiment, multiple sound characteristics of a sound signal (e.g., sound frequency, sound intensity, or voiceprint waveform) are specified as default characteristics.

For example, when a sound signal coincides with a plurality of default characteristics, default operations corresponding to these default characteristics are executed. For example, when a sound signal received by the sound input unit 306 coincides with a default frequency, the control unit 304 controls the projection unit 202 to perform projection, and when the sound signal also coincides with a default voiceprint waveform (i.e., also coinciding with another default characteristic), the control unit 304 controls the projection apparatus 104 to establish a network connection with the electronic device 102. Accordingly, the control unit 304 receives and processes image data coming from the electronic device 102 via the network connection and thereby controls the projection unit 202 to perform projection according to the image data. The method that the control unit 304 controls the projection apparatus 104 to establish a network connection with the electronic device 102 includes: the control unit 304 sends out a connection request to the electronic device 102 via the communication unit 302 to establish a network connection with the electronic device 102, for example. In another embodiment, the method for controlling the projection apparatus 104 to establish a network connection with the electronic device 102 is described as below. The control unit 304 of the projection apparatus 104 controls the sound output unit 308 to output a sound signal having a specific characteristic to the electronic device 102, wherein the specific characteristic coincides with a default characteristic according to which the electronic device 102 determines whether to establish a network connection with the projection apparatus 104. After the sound input unit 314 of the electronic device 102 receives the sound signal coming from the projection apparatus 104, the control unit 310 of the electronic device 102 then controls the communication unit 312 to send out a connection request to the communication unit 302 of the projection apparatus 104 according to the sound signal received by the sound input unit 314. Accordingly, a network connection is established between the electronic device 102 and the projection apparatus 104 for the control unit 304 of the projection apparatus 104 to receive and process the image data coming from the electronic device 102 via the network connection, and further control the projection unit 202 to perform projection according to the image data. The control unit 310 of the electronic device 102 may comprise a memory (not shown) storing at least one default characteristic of the sound signal. In one embodiment, the network connection established between the projection apparatus 104 and the electronic device 102 may be controlled by a control command of the projection apparatus 104 or controlled by a control command of the electronic device 102. The aforementioned methods for controlling the projection apparatus 104 to establish a network connection with the electronic device 102 are exemplary and shall not limit the disclosure.

In some embodiments, a control command for controlling the sound output unit 308 to output a sound signal to the electronic device 102 is generated through a user's operation of the projection apparatus 104. Similarly, a control command for controlling the sound output unit 316 to output a sound signal to the projection apparatus 104 may also be generated through a user's operation of the electronic device 102.

Figure 4:
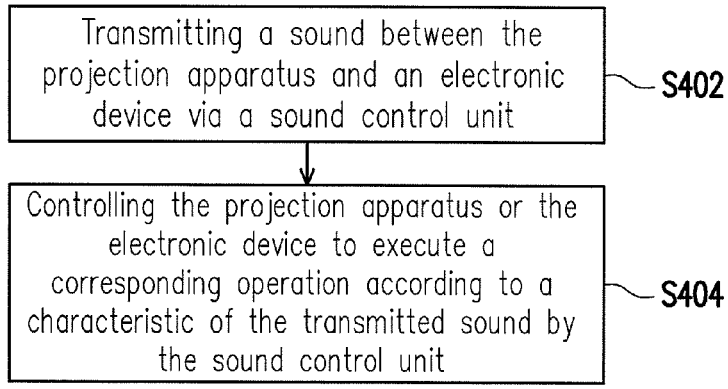
FIG. 4 is a flowchart illustrating a method for operating a projection apparatus of one embodiment of the disclosure.

FIG. 4 is a flowchart illustrating a method for operating a projection apparatus of one embodiment of the disclosure. Referring to FIG. 4, the method for operating the projection apparatus includes the following steps. First, receiving or transmitting a sound between the projection apparatus and an electronic device external to the projection apparatus via a sound control unit (Step S402). Next, controlling the projection apparatus or the electronic device to execute a corresponding operation according to a characteristic of the sound (Step S404). In the present embodiment, the characteristic of the sound transmitted between the sound control unit and the electronic device (e.g. the sound transmitted from the electronic device and received by the sound control unit; or the sound transmitted from the sound control unit and received by the electronic device) includes at least one of sound intensity, sound frequency, and voiceprint, and the default operation includes unlocking the projection apparatus, enabling the projection apparatus to establish a network connection with the electronic device, controlling the projection apparatus to perform projection, etc., for example.

Figure 5:
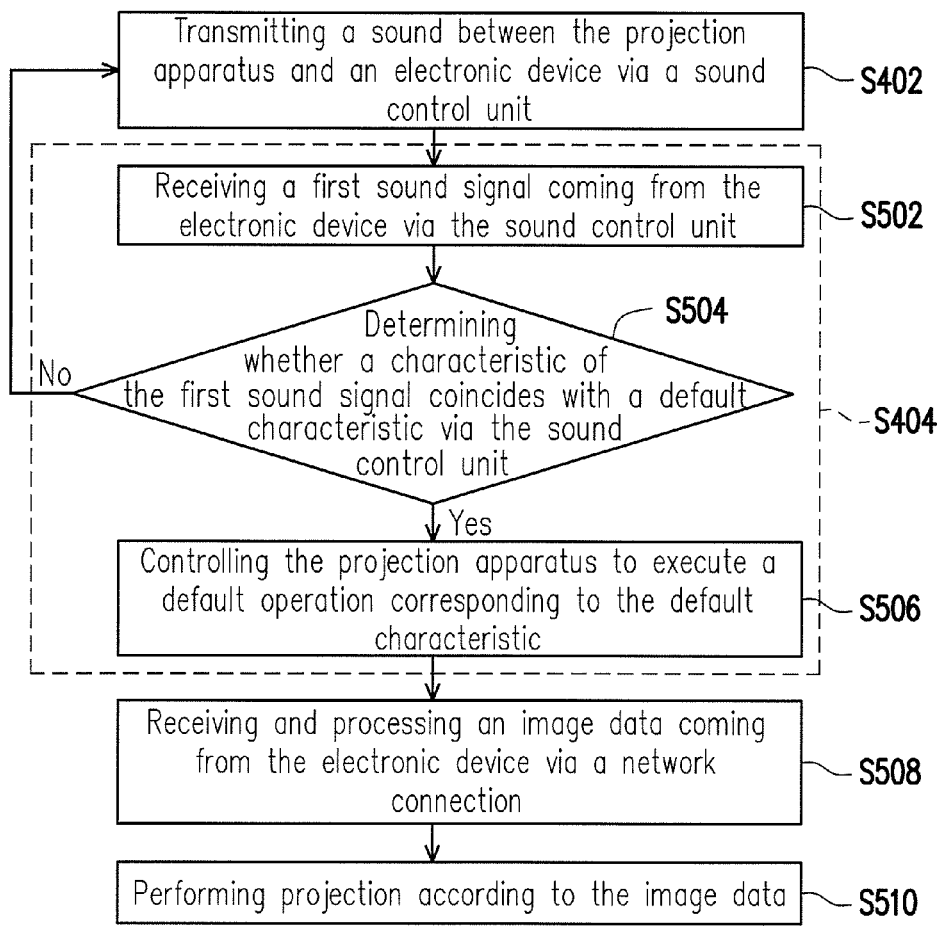
FIG. 5 is a flowchart illustrating a method for operating a projection apparatus of another embodiment of the disclosure.

FIG. 5 is a flowchart illustrating a method for operating a projection apparatus of one embodiment of the disclosure. Referring to FIG. 4 and FIG. 5, in one embodiment, Step S404 further includes the following steps. First, a first sound signal coming from the electronic device is received via the sound control unit (Step S502). Next, whether a characteristic of the first sound signal coincides with a default characteristic is determined via the sound control unit (Step S504). If the characteristic of the first sound signal coincides with the default characteristic, the projection apparatus is controlled to execute a default operation corresponding to the default characteristic (Step S506). The default operation includes controlling the projection apparatus to establish a network connection with the electronic device, for example. However, the disclosure is not limited to this example. In one embodiment, the default operation may include unlocking the projection apparatus. In another embodiment, the default operation may include unlocking the projection apparatus before controlling the projection apparatus to establish a network connection with the electronic device. If the characteristic of the first sound signal does not coincide with the default characteristic, returning to Step S402. After the projection apparatus executes the default operation corresponding to the default characteristic in Step S506 of the present embodiment (e.g., after the projection apparatus establishes a network connection with the electronic device), the sound control unit further receives and processes image data coming from the electronic device via the network connection (Step S508). Afterwards, according to the image data, the projection apparatus is controlled to perform projection (Step S510).

Figure 6:
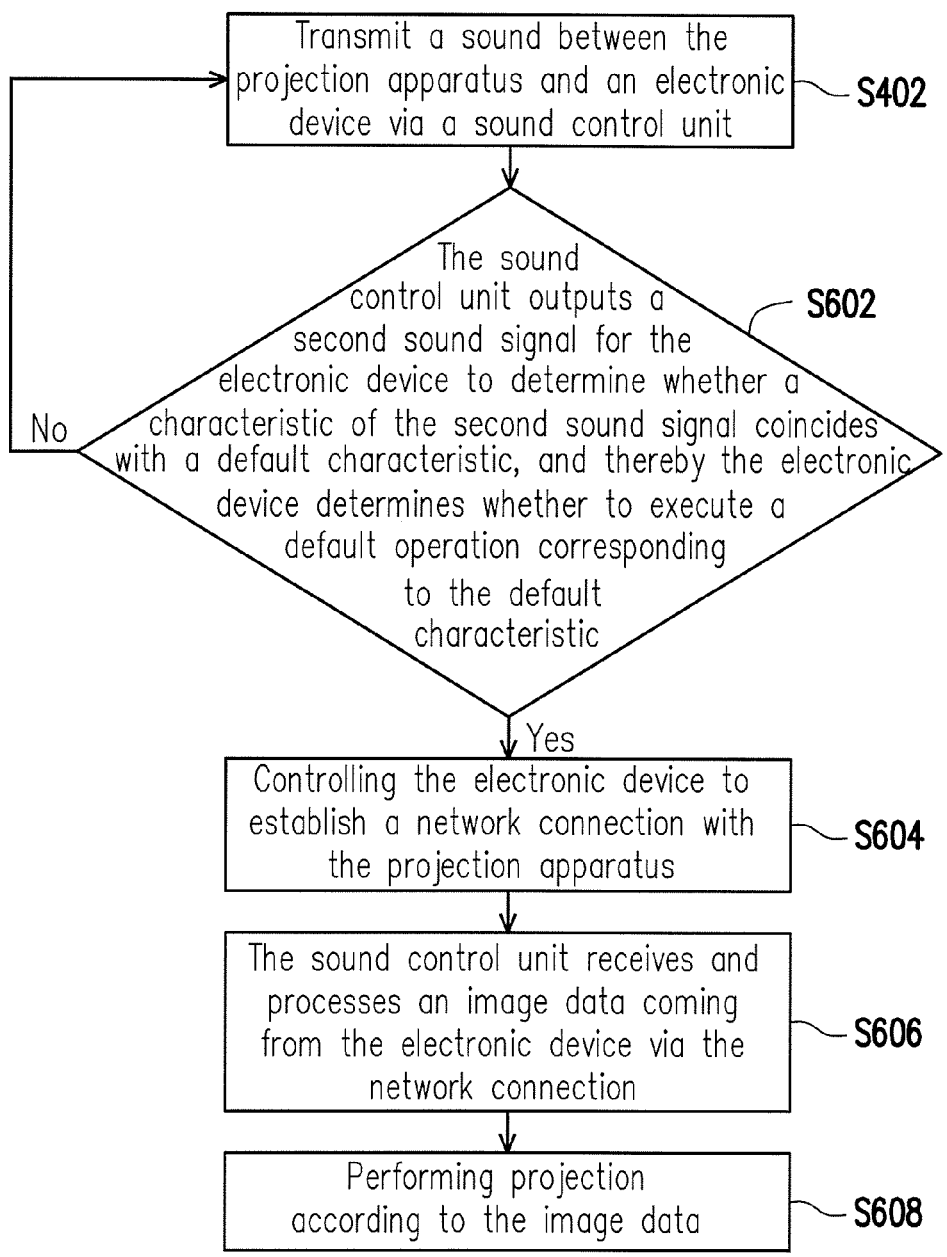
FIG. 6 is a flowchart illustrating a method for operating a projection apparatus of another embodiment of the disclosure.

FIG. 5 above provides an example to describe that in Step S404, the sound control unit controls the projection apparatus to execute a corresponding operation according to a characteristic of the sound received by the sound control unit. FIG. 6 is a flowchart illustrating a method for operating a projection apparatus of one embodiment of the disclosure. Referring to FIG. 4 and FIG. 6, Step S404 includes the following steps. The sound control unit outputs a second sound signal for the electronic device to determine whether a characteristic of the second sound signal coincides with a default characteristic, and the electronic device is further made to determine whether to execute a default operation corresponding to the default characteristic (Step S602). In another embodiment, after the electronic device determines whether a characteristic of a second sound signal coincides with a default characteristic, the projection apparatus is further made to determine whether to execute a default operation corresponding to the default characteristic. In the present embodiment, when the characteristic of the second sound signal coincides with the default characteristic, the electronic device controls the electronic device to establish a network connection with the projection apparatus (Step S604). Next, the sound control unit receives and processes image data coming from the electronic device via the network connection (Step S606). Afterwards, according to the image data, the projection apparatus is further controlled to perform projection (Step S608). However, in Step S602 above, if the characteristic of the second sound signal does not coincide with the default characteristic, returning to Step S402.

In the embodiments of the disclosure, the projection apparatus or the electronic device is controlled to execute a corresponding operation according to a characteristic of a sound transmitted between the projection apparatus and the electronic device. In the embodiments of the disclosure, a sound signal coming from the electronic device is received via the sound input unit of the sound control unit of the projection apparatus, or, alternatively, a sound signal is outputted to the electronic device via the sound output unit of the sound control unit of the projection apparatus, so as to control the projection apparatus or the electronic device to execute a default operation corresponding to a default characteristic of a sound signal. Accordingly, utilization convenience and safety are greatly enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art after reading the disclosure. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system comprising a projection apparatus and an electronic device external to the projection apparatus, the projection apparatus comprising a sound control unit, a communication unit, and a projection unit, and the electronic device comprising another communication unit, wherein the projection apparatus is adapted, to be controlled by the electronic device or control the electronic device, to execute a corresponding operation according to a characteristic of a sound transmitted between the sound control unit of the projection apparatus and the electronic device, and the corresponding operation according to the characteristic of the sound comprises establishing a network connection between the projection apparatus and the electronic device via the communication unit of the projection apparatus and the communication unit of the electronic device, wherein the sound control unit is coupled to the projection unit and is adapted to control the projection apparatus or the electronic device to execute the corresponding operation according to the characteristic of the sound transmitted between the sound control unit and the electronic device, wherein the sound control unit is coupled to the projection unit and is adapted to control the projection apparatus or the electronic device to execute the corresponding operation according to the characteristic of the sound transmitted between the sound control unit and the electronic device, wherein the sound control unit comprises a sound input unit and a control unit, wherein the sound input unit is adapted to receive a first sound signal coming from the electronic device, wherein the control unit is coupled to the sound input unit and the projection unit, and is adapted to determine whether a characteristic of the first sound signal coincides with a default characteristic, and is adapted to control the projection apparatus to execute a default operation corresponding to the default characteristic if the characteristic of the first sound signal coincides with the default characteristic, and wherein the default operation comprises unlocking the projection apparatus.

2. The projection system according to claim 1, wherein the communication unit of the projection apparatus is coupled to the control unit, and wherein the default operation comprises establishing the network connection with the electronic device via the communication unit, and the control unit is adapted to receive and process image data coming from the electronic device via the network connection and to control the projection unit to perform projection according to the image data.

3. The projection system according to claim 1, wherein the sound control unit comprises a sound output unit and a control unit, wherein the control unit is coupled to the sound output unit and the projection unit, and the control unit is adapted to control the sound output unit to output a second sound signal for the electronic device to determine whether a characteristic of the second sound signal coincides with a default characteristic, such that the projection apparatus or the electronic device is capable of determining whether to execute a default operation corresponding to the default characteristic, wherein the default operation comprises establishing the network connection with the electronic device via the communication unit when the characteristic of the second sound signal coincides with the default characteristic, and the control unit is adapted to receive and process image data coming from the electronic device via the network connection and to control the projection unit to perform projection according to the image data.

4. A projection apparatus comprising a projection unit, a sound control unit and a communication unit, wherein the sound control unit is coupled to the projection unit and is adapted, to control the projection apparatus or an electronic device external to the projection apparatus, to execute a corresponding operation according to a characteristic of a sound transmitted between the sound control unit of the projection apparatus and the electronic device, and the corresponding operation according to the characteristic of the sound comprises establishing a network connection between the projection apparatus and the electronic device via the communication unit of the projection apparatus and a communication unit of the electronic device, wherein the sound control unit comprises a sound input unit and a control unit, wherein the sound input unit is adapted to receive a first sound signal coming from the electronic device, wherein the control unit is coupled to the sound input unit and the projection unit, and is adapted to determine whether a characteristic of the first sound signal coincides with a default characteristic, and is adapted to control the projection apparatus to execute a default operation corresponding to the default characteristic if the characteristic of the first sound signal coincides with the default characteristic, and wherein the default operation comprises unlocking the projection apparatus.

5. The projection apparatus according to claim 4, wherein the communication unit of the projection apparatus is coupled to the control unit, and wherein the default operation comprises establishing the network connection with the electronic device via the communication unit, and the control unit is adapted to receive and process image data coming from the electronic device via the network connection and to control the projection unit to perform projection according to the image data.

6. The projection apparatus according to claim 4, wherein the sound control unit comprises a sound output unit and a control unit, wherein the control unit is coupled to the sound output unit and the projection unit, and the control unit is adapted to control the sound output unit to output a second sound signal for the electronic device to determine whether a characteristic of the second sound signal coincides with a default characteristic, such that the projection apparatus or the electronic device is capable of determining whether to execute a default operation corresponding to the default characteristic, wherein the default operation comprises establishing the network connection with the electronic device via the communication unit when the characteristic of the second sound signal coincides with the default characteristic, and the control unit is adapted to receive and process image data coming from the electronic device via the network connection and to control the projection unit to perform projection according to the image data.

7. An operating method for operating a projection apparatus, wherein the projection apparatus comprises a sound control unit and a communication unit, the operating method comprising:

receiving or transmitting a sound between the sound control unit of the projection apparatus and an electronic device external to the projection apparatus; and controlling, the projection apparatus or the electronic device, to execute a corresponding operation according to a characteristic of the sound, wherein the corresponding operation according to the characteristic of the sound comprises establishing a network connection between the projection apparatus and the electronic device via the communication unit of the projection apparatus and a communication unit of the electronic device, wherein the step of controlling the projection apparatus to execute the corresponding operation according to the characteristic of the transmitted sound comprises: receiving, via the sound control unit, a first sound signal coming from the electronic device; determining, via the sound control unit, whether a characteristic of the first sound signal coincides with a default characteristic; and controlling the projection apparatus to execute a default operation corresponding to the default characteristic, if the characteristic of the first sound signal coincides with the default characteristic, and wherein the default operation comprises unlocking the projection apparatus.

8. The operating method according to claim 7, wherein the default operation comprises establishing the network connection with the electronic device by the projection apparatus.

9. The operating method according to claim 8, further comprising:

receiving and processing image data coming from the electronic device via the network connection by the sound control unit; and performing projection according to the image data.

10. The operating method according to claim 7, wherein the step of controlling the projection apparatus or the electronic device to execute the corresponding operation according to the characteristic of the sound comprises:

outputting a second sound signal by the sound control unit for the electronic device to determine whether a characteristic of the second sound signal coincides with a default characteristic, and determining, by the projection apparatus or the electronic device, to execute a default operation corresponding to the default characteristic if the characteristic of the second sound signal coincides with a default characteristic.

11. The operating method according to claim 10, wherein the default operation comprises establishing the network connection between the electronic device and the projection apparatus when the characteristic of the second sound signal coincides with the default characteristic, further comprising:

receiving and processing image data coming from the electronic device via the network connection by the sound control unit; and performing projection according to the image data.

12. The operating method according to claim 7, wherein the characteristic of the sound comprises at least one of sound intensity, sound frequency, and voiceprint.

* * * * *